(12) United States Patent
Horiuchi

(10) Patent No.: US 9,889,710 B2
(45) Date of Patent: Feb. 13, 2018

(54) PNEUMATIC TIRE MOUNT METHOD, AND COMBINATION PNEUMATIC TIRE

(71) Applicant: The Yokohama Rubber Co., LTD., Minato-ku, Tokyo (JP)

(72) Inventor: Kenji Horiuchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 205 days.

(21) Appl. No.: 14/904,677

(22) PCT Filed: Jul. 15, 2014

(86) PCT No.: PCT/JP2014/068821
§ 371 (c)(1),
(2) Date: Jan. 12, 2016

(87) PCT Pub. No.: WO2015/012160
PCT Pub. Date: Jan. 29, 2015

(65) Prior Publication Data
US 2016/0159159 A1    Jun. 9, 2016

(30) Foreign Application Priority Data

Jul. 24, 2013   (JP) ................................. 2013-153858

(51) Int. Cl.
*B60C 11/03* (2006.01)
*B60C 19/00* (2006.01)

(52) U.S. Cl.
CPC ........ *B60C 11/033* (2013.01); *B60C 11/0304* (2013.01); *B60C 11/0306* (2013.01); *B60C 11/0332* (2013.01); *B60C 19/001* (2013.01)

(58) Field of Classification Search
CPC . B60C 11/033; B60C 11/0332; B60C 19/001; B60C 11/0306; B60C 11/0304

USPC ....................................................... 156/110.1
See application file for complete search history.

(56) References Cited

U.S. PATENT DOCUMENTS

| | | | |
|---|---|---|---|
| 6,715,522 | B1 | 4/2004 | Wada |
| 2012/0060987 | A1 | 3/2012 | Nemoto |
| 2012/0285592 | A1 | 11/2012 | Kameda |

FOREIGN PATENT DOCUMENTS

| | | |
|---|---|---|
| JP | H01-0190504 | 7/1989 |
| JP | H11-0139108 | 5/1999 |
| JP | H11-0245621 | 9/1999 |
| JP | 2000-158908 | 6/2000 |
| JP | 2002-274120 | 9/2002 |
| JP | 2010-163081 | 7/2010 |
| JP | 2010-173509 | 8/2010 |

(Continued)

OTHER PUBLICATIONS

International Search Report for International Application No. PCT/JP2014/068821 dated Oct. 21, 2014, 4 pages, Japan.

*Primary Examiner* — Moshe Wilensky
(74) *Attorney, Agent, or Firm* — Thorpe North & Western

(57) ABSTRACT

Each pneumatic tire disposed on the rear wheel side has a total groove surface area ratio of 20% or more and 27% or less in ground-contacting width. Each pneumatic tire disposed on the front wheel side and the rear wheel side has a smaller groove surface area ratio on the vehicle outer side than on the vehicle inner side in the ground-contacting width. The difference in the groove surface area ratio is 7% or more and 15% or less. The total groove surface area ratio is greater on the front wheel side than on the rear wheel side, the difference in the total groove surface area ratio being 3% or more and 10% or less.

4 Claims, 4 Drawing Sheets

(56) References Cited

FOREIGN PATENT DOCUMENTS

| | | |
|---|---|---|
| JP | 2012-056479 | 3/2012 |
| JP | 2012-236455 | 12/2012 |

| GROOVE SURFACE AREA | CONVENTIONAL EXAMPLE | COMPARATIVE EXAMPLE 1 | COMPARATIVE EXAMPLE 2 | COMPARATIVE EXAMPLE 3 | WORKING EXAMPLE 1 | WORKING EXAMPLE 2 |
|---|---|---|---|---|---|---|
| GROUND CONTACT WIDTH [MM] FRONT WHEEL SIDE / REAR WHEEL SIDE | 216 / 266 | 216 / 266 | 216 / 266 | 216 / 266 | 216 / 266 | 216 / 266 |
| FRONT WHEEL SIDE TOTAL GROOVE SURFACE AREA RATIO [%] | 32 | 30 | 30 | 30 | 30 | 30 |
| REAR WHEEL SIDE TOTAL GROOVE SURFACE AREA RATIO [%] | 30 | 26 | 26 | 26 | 27 | 20 |
| TOTAL GROOVE SURFACE AREA RATIO [%] FRONT WHEEL SIDE – REAR WHEEL SIDE | 2 | 4 | 4 | 4 | 3 | 10 |
| FRONT WHEEL SIDE: GROOVE SURFACE AREA RATIO [%] INNER SIDE – OUTER SIDE | 5 | 5 | 8 | 8 | 8 | 8 |
| REAR WHEEL SIDE: GROOVE SURFACE AREA RATIO [%] INNER SIDE – OUTER SIDE | 8 | 8 | 10 | 10 | 10 | 10 |
| FRONT WHEEL SIDE: OUTER SIDE CIRCUMFERENTIAL DIRECTION GROOVE MAXIMUM GROOVE WIDTH A [MM] / GROUND CONTACT WIDTH RATIO [%] | 18.1 / 8.3 | 18.1 / 8.3 | 18.1 / 8.3 | 18.1 / 8.3 | 18.1 / 8.3 | 18.1 / 8.3 |
| FRONT WHEEL SIDE: INNER SIDE CIRCUMFERENTIAL DIRECTION GROOVE AVERAGE VALUE B [MM] | 16.3 | 16.3 | 16.3 | 16.3 | 16.3 | 16.3 |
| REAR WHEEL SIDE: OUTER SIDE CIRCUMFERENTIAL DIRECTION GROOVE MAXIMUM GROOVE WIDTH C [MM] / GROUND CONTACT WIDTH RATIO [%] | 15.5 / 5.8 | 15.5 / 5.8 | 15.5 / 5.8 | 15.5 / 5.8 | 15.5 / 5.8 | 15.5 / 5.8 |
| REAR WHEEL SIDE: INNER SIDE CIRCUMFERENTIAL DIRECTION GROOVE AVERAGE VALUE D [MM] | 16.1 | 16.1 | 16.1 | 17.3 | 17.3 | 17.3 |
| D/C [%] – B/A [%] | -3.0 | -3.0 | -3.0 | 3.5 | 3.5 | 3.5 |
| REAR WHEEL SIDE: OUTER SIDE LAND PORTION LUG GROOVE TOTAL GROOVE SURFACE AREA RATIO (OUTER/INNER) [%] | 95 | 95 | 95 | 95 | 99 | 99 |
| REAR WHEEL SIDE: INNER SIDE LAND PORTION LUG GROOVE TOTAL GROOVE SURFACE AREA RATIO (OUTER/INNER) [%] | 93 | 93 | 93 | 93 | 93 | 93 |
| TOTAL LUG GROOVE SURFACE AREA RATIO [%] FRONT WHEEL SIDE – REAR WHEEL SIDE | 2 | 2 | 2 | 2 | 6 | 6 |
| STEERING STABILITY PERFORMANCE ON DRY ROAD SURFACE | 100 | 105 | 106 | 105 | 105 | 105 |
| STEERING STABILITY PERFORMANCE ON WET ROAD SURFACE | 100 | 95 | 98 | 100 | 102 | 101 |

FIG. 3A

| GROOVE SURFACE AREA | WORKING EXAMPLE 3 | WORKING EXAMPLE 4 | WORKING EXAMPLE 5 | WORKING EXAMPLE 6 | WORKING EXAMPLE 7 | WORKING EXAMPLE 8 | WORKING EXAMPLE 9 | WORKING EXAMPLE 10 | WORKING EXAMPLE 11 | WORKING EXAMPLE 12 | WORKING EXAMPLE 13 |
|---|---|---|---|---|---|---|---|---|---|---|---|
| GROUND CONTACT WIDTH [MM] FRONT WHEEL SIDE / REAR WHEEL SIDE | 216 / 266 | 216 / 266 | 216 / 266 | 216 / 266 | 216 / 266 | 216 / 266 | 216 / 266 | 216 / 266 | 216 / 266 | 216 / 266 | 216 / 266 |
| FRONT WHEEL SIDE TOTAL GROOVE SURFACE AREA RATIO [%] | 30 | 30 | 30 | 30 | 30 | 30 | 30 | 30 | 30 | 30 | 30 |
| REAR WHEEL SIDE TOTAL GROOVE SURFACE AREA RATIO [%] | 26 | 26 | 26 | 26 | 26 | 26 | 26 | 26 | 26 | 26 | 26 |
| TOTAL GROOVE SURFACE AREA RATIO [%] FRONT WHEEL SIDE − REAR WHEEL SIDE | 4 | 4 | 4 | 4 | 4 | 4 | 4 | 4 | 4 | 4 | 4 |
| FRONT WHEEL SIDE: GROOVE SURFACE AREA RATIO [%] INNER SIDE − OUTER SIDE | 7 | 15 | 8 | 8 | 8 | 8 | 8 | 8 | 8 | 8 | 8 |
| REAR WHEEL SIDE: GROOVE SURFACE AREA RATIO [%] INNER SIDE − OUTER SIDE | 7 | 15 | 10 | 10 | 10 | 10 | 10 | 10 | 10 | 10 | 10 |
| FRONT WHEEL SIDE: CIRCUMFERENTIAL DIRECTION GROOVE MAXIMUM GROOVE WIDTH A [MM] / GROUND CONTACT WIDTH RATIO [%] | 18.1 / 8.3 | 18.1 / 8.3 | 14.6 / 6.8 | 8.7 / 4.0 | 18.1 / 8.3 | 18.1 / 8.3 | 16.5 / 7.5 | 15.1 / 7.0 | 19.4 / 9.0 | 18.1 / 8.3 | 16.5 / 7.5 |
| FRONT WHEEL SIDE: CIRCUMFERENTIAL DIRECTION GROOVE AVERAGE VALUE B [MM] | 16.3 | 16.3 | 16.3 | 16.3 | 16.3 | 16.3 | 16.3 | 16.3 | 16.3 | 16.3 | 16.3 |
| REAR WHEEL SIDE: CIRCUMFERENTIAL DIRECTION GROOVE MAXIMUM GROOVE WIDTH C [MM] / GROUND CONTACT WIDTH RATIO [%] | 15.5 / 5.8 | 15.5 / 5.8 | 15.5 / 5.8 | 1.5 / 0.7 | 15.5 / 5.8 | 15.5 / 5.8 | 17.2 / 6.5 | 16.0 / 6.0 | 17.5 / 8.0 | 15.5 / 5.8 | 17.2 / 6.5 |
| REAR WHEEL SIDE: CIRCUMFERENTIAL DIRECTION GROOVE AVERAGE VALUE D [MM] | 17.3 | 17.3 | 17.3 | 17.8 | 17.3 | 17.3 | 17.3 | 17.3 | 17.3 | 17.3 | 17.3 |
| D/C [%] − B/A [%] | 3.5 | 3.5 | 1.0 | 10.0 | 3.5 | 3.5 | 3.5 | 4.0 | 3.5 | 3.5 | 3.5 |
| REAR WHEEL SIDE: OUTER SIDE PORTION LUG GROOVE TOTAL GROOVE SURFACE AREA RATIO (OUTER/INNER) [%] | 99 | 99 | 99 | 107 | 110 | 100 | 100 | 100 | 100 | 102 | 102 |
| REAR WHEEL SIDE: INNER SIDE PORTION LUG GROOVE TOTAL GROOVE SURFACE AREA RATIO (OUTER/INNER) [%] | 93 | 93 | 93 | 93 | 90 | 93 | 93 | 93 | 93 | 95 | 95 |
| TOTAL LUG GROOVE SURFACE AREA RATIO [%] FRONT WHEEL SIDE − REAR WHEEL SIDE | 6 | 6 | 6 | 6 | 20 | 7 | 7 | 7 | 7 | 7 | 7 |
| STEERING STABILITY PERFORMANCE ON DRY ROAD SURFACE | 103 | 103 | 104 | 107 | 103 | 105 | 106 | 106 | 104 | 106 | 106 |
| STEERING STABILITY PERFORMANCE ON WET ROAD SURFACE | 102 | 102 | 102 | 100 | 103 | 102 | 104 | 102 | 104 | 104 | 106 |

FIG. 3B

PNEUMATIC TIRE MOUNT METHOD, AND COMBINATION PNEUMATIC TIRE

TECHNICAL FIELD

The present technology pertains to a pneumatic tire mount method and to a combination pneumatic tire which achieves steering stability performance on both a dry road surface and on a wet road surface to a high degree.

BACKGROUND

A typical method of providing steering stability performance on both a dry road surface and on a wet road surface involves, for a tire mounted on a vehicle, improving pattern rigidity in a tire circumferential direction on a vehicle outer side of a tire equatorial plane, and relatively enlarging a groove surface area and volume on a vehicle inner side. Such a method does enable the steering stability performance to be provided on both the dry road surface and the wet road surface. However, bringing out the maximum potential of the vehicle while improving the performance of the vehicle requires that the steering stability performance on both the dry road surface and on the wet road surface be achieved to a high degree. As such, the development of a pneumatic tire mount method and a combination pneumatic tire suitable for the vehicle is desired.

A pneumatic tire mount method and a pneumatic tire for a front wheel described in Japanese Unexamined Patent Application Publication No. 2002-274120A aim to improve braking performance. Japanese Unexamined Patent Application Publication No. 2002-274120A describes an installation method of a pneumatic tire of using a pneumatic tire which rigidity in the circumferential direction per unit area of a tread pattern is set so as to be greater in a region other than a region on opposite side of a tire equatorial surface, wherein the region larger in rigidity in the circumferential direction is arranged on the vehicle inner side for at least the front wheel of the vehicle. Also, Japanese Unexamined Patent Application Publication No. 2002-274120A describes a pneumatic tire for a front wheel in which the rigidity in the circumferential direction per unit area of the tread pattern varies in left and right regions of the tire equatorial surface. In the pneumatic tire for the front wheel, the rigidity of the tread pattern in a region on the installation inside of the vehicle is greater than the rigidity of the tread pattern in a region on the installation outside of the vehicle.

A motor vehicle and combination of front wheel and rear wheel pneumatic tires used therefor described in Japanese Unexamined Patent Application Publication No. 2000-158908A aim to shorten the braking distance. Japanese Unexamined Patent Application Publication No. 2000-158908A describes a motor vehicle equipped with front wheel and rear wheel pneumatic tires. Each pneumatic tire is provided with a plurality of land portions partitioned by a tread groove. The rear wheel pattern rigidity, which is the sum of the circumferential rigidity of each land portion on the pneumatic tire of the rear wheel, is greater than the front wheel pattern rigidity, which is the sum of the circumferential rigidity of each land portion on the pneumatic tire of the front wheel.

A pneumatic radial tire for a rear wheel drive type automobile described in Japanese Unexamined Patent Application Publication No. H11-245621A aims to improve the traveling stability on a dry road surface without lowering the water discharging performance on a wet road surface. Japanese Unexamined Patent Application Publication No. H11-245621A describes a pneumatic tire having a directional tread pattern provided with a circumferential direction groove extending continuously in parallel to or substantially parallel to a tire circumferential direction, and with a plurality of directional diagonal grooves extending in a direction that is diagonal with respect to the tire circumferential direction and arranged with equal spacing in the tire circumferential direction. Upon mounting on the front wheels and rear wheels of the same vehicle for use as a set, a tire installing axle at the time of installing on the vehicle is specified, a tire formed with a tread pattern having a relatively large negative ratio is set for a front wheel tire, and a tire formed with a tread pattern having a relatively small negative ratio is set for a rear wheel tire.

A combination tire for a four-wheel passenger car and its mounting method described in Japanese Unexamined Patent Application Publication No. H11-139108A aim to improve hydro-planing preventing performance during forward movement while suppressing noise at the time of passing. Japanese Unexamined Patent Application Publication No. H11-139108A describes mounting a tire provided with a plurality of circumferential main grooves extended in the circumferential direction of the tread on two front wheels, and mounting a tire having a directional pattern provided with a plurality of inclined main grooves inclined to the outside of the tire from a center part toward an opposite direction, replacing the circumferential main grooves on the tread, to a rotating direction on two rear wheels.

SUMMARY

The present technology provides a pneumatic tire mount method and a combination pneumatic tire which achieves steering stability performance on both a dry road surface and a wet road surface to a high degree.

A pneumatic tire mount method of the present technology, used with a plurality of pneumatic tires mounted on a vehicle, is a pneumatic tire mount method with an orientation of an inner side and an outer side determined with respect to left and right sides of the vehicle for each of the pneumatic tires, and with a position on a front wheel side and a rear wheel side of the vehicle determined. Each of the pneumatic tires is provided with at least one circumferential direction groove formed in a tread surface on a vehicle inner side and vehicle outer side of a tire equatorial plane, and extending in a tire circumferential direction, and is provided with a plurality of lug grooves formed in the tire circumferential direction, extending in a direction orthogonal to the circumferential direction groove, at least on the tread surface of a land portion on an outermost side in a tire width direction, among a plurality of land portions partitioned by the circumferential direction groove and extending in the tire circumferential direction. Each of the pneumatic tires arranged on the rear wheel side has a total groove surface area ratio with respect to a ground contact width of not less than 20% and not more than 27%. Each of the pneumatic tires arranged on the front wheel side and on the rear wheel side also has a groove surface area ratio that is smaller on the vehicle outer side than on the vehicle inner side, with respect to the ground contact width, a difference in the groove surface area ratio, calculated as a percentage, being not less than 7% and not more than 15%. Each of the pneumatic tires arranged on the front wheel side and on the rear wheel side also has a total groove surface area ratio with respect to the ground contact width that is greater on the front wheel side than on the rear wheel side, a difference in the total groove surface area ratio, calculated as a percentage, being not less than 3% and not more than 10%. Each of the pneumatic tires arranged on the front wheel side and on the rear wheel side also has a ratio of an average value of a groove width of all of the circumferential direction grooves on the vehicle inner side to a groove width of one of the circumferential direction grooves having the greatest width on the vehicle inner side, with respect to the ground contact width, that is greater on the rear wheel side than on the front wheel side, a difference in the ratio of the circumferential direction grooves, calculated as a percentage, being not less than 1 and not more than 10. Each of the pneumatic tires arranged on the front wheel side and on the rear wheel side also has a ratio of a total groove surface area of the lug grooves on the vehicle outer side to a total groove surface area of the lug grooves on the vehicle inner side, with respect to the ground contact width, that is greater on the front wheel side than on the rear wheel side, a difference in the total groove surface area ratio of the lug grooves, calculated as a percentage, being not less than 6 and not more than 20.

Typical methods of providing steering stability performance on both the dry road surface and the wet road surface include enlarging the groove surface area on the vehicle inner side, or enlarging the groove surface area on the front wheel side. However, in consideration of increasing demand for steering stability performance on the dry road surface, there is a need to decrease the absolute value of the groove surface area. Nevertheless, doing so has a tendency to create difficulty in securing steering stability performance on the wet road surface. However, in the present technology, in terms of steering stability performance on the wet road surface, there has been a discovery that a great improvement to the steering stability performance on the wet road surface is imparted by the groove surface area of the lug grooves on the vehicle outer side for the front wheel side, and by the groove surface area of the circumferential direction grooves on the vehicle inner side for the rear wheel side.

That is, having the total groove surface area ratio in the ground contact width of the pneumatic tires arranged on the rear wheel side be less than 20% leads to excessive steering stability performance on the dry road surface and causes a difficulty in supplementing the steering stability performance on the wet road surface. Conversely, having the total groove surface area ratio exceed 27% poses a difficulty in securing steering stability performance on the dry road surface. In addition, having the groove surface area ratio on the vehicle outer side be smaller with respect to the vehicle inner side with respect to the ground contact width of the pneumatic tires arranged on the front wheel side and on the rear wheel side, and having the difference in the groove surface area ratio, calculated as a percentage, be less than 7% leads to excessive steering stability performance on the wet road surface and causes a decrease in the steering stability performance on the dry road surface. Conversely, having the difference exceed 15% leads to excessive steering stability performance on the dry road surface and poses a difficulty in supplementing the steering stability performance on the wet road surface. In addition, having the total groove surface area ratio in the ground contact width of the pneumatic tires arranged on the front wheel side and on the rear wheel side be greater on the front wheel side than on the rear wheel side, and having the difference in the total groove surface area ratio, calculated as a percentage, be less than 3%, leads to excessive steering stability performance on the dry road surface and poses a difficulty in supplementing the steering stability performance on the wet road surface. Conversely, having the difference exceed 10% leads to excessive steering stability performance on the wet road surface and decreases the steering stability performance on the dry road surface. In addition, having the ratio of the average value of the groove width of all the circumferential direction grooves on the vehicle inner side to the groove width of the circumferential groove having the greatest width on the vehicle inner side, in the ground contact width of the pneumatic tires arranged on the front wheel side and on the rear wheel side, be greater on the rear wheel side than on the front wheel side, and having the difference in the ratio of the circumferential direction grooves, calculated as a percentage, be less than 1%, leads to excessive steering stability performance on the dry road surface and poses a difficulty in supplementing the steering stability performance on the wet road surface. Conversely, having the difference exceed 10% leads to excessive steering stability performance on the wet road surface and decreases the steering stability performance on the dry road surface. In addition, having the ratio of the total groove surface area of the lug grooves on the vehicle outer side to the total groove surface area of the lug grooves on the vehicle inner side, in the ground contact width of the pneumatic tires mounted on the front wheel side and on the rear wheel side, be greater on the front wheel side than on the rear wheel side, and having the difference in the total groove surface area ratio of the lug grooves, calculated as a percentage, be less than 6% leads to excessive steering stability performance on the dry road surface and poses a difficulty in supplementing the steering stability performance on the wet road surface. Conversely, having the difference exceed 20% leads to excessive steering stability performance on the wet road surface and decreases the steering stability performance on the dry road surface. As a result, according to the pneumatic tire mount method and the combination pneumatic tire of the present technology, steering stability performance on both the dry road surface and on the wet road surface are achieved to a high degree.

In addition, in the pneumatic tire mount method of the present technology, each of the pneumatic tires arranged on the front wheel side and on the rear wheel side has a ratio of the groove width of one of the circumferential direction grooves having the greatest width on the vehicle outer side of the front wheel side to the ground contact width, calculated as a percentage, that is not less than 7% and not more than 9%, and has the ratio of the groove width of the one of the circumferential direction grooves having the greatest width on the vehicle outer side of the rear wheel side to the ground contact width, calculated as a percentage, that is not less than 6% and not more than 8%. Also, a difference in the ratio of the one of the circumferential direction grooves having the greatest width on the vehicle outer side to the ground contact width, calculated as a percentage, between the front wheel side and the rear wheel side, is within 1%. In addition, the ratio of the average value of the groove width of all of the circumferential direction grooves on the vehicle inner side to the groove width of the one of the circumferential direction grooves having the greatest width on the vehicle inner side, with respect to the ground contact width, is greater on the rear wheel side than on the front wheel side, the difference in the ratio of the circumferential direction grooves, calculated as a percentage, being not less than 4 and not more than 10.

According to this pneumatic tire mount method, the groove width of the circumferential direction groove having the greatest width on the vehicle outer side of the front wheel side is relatively large, and each pneumatic tire arranged on the front wheel side and on the rear wheel side has the ratio of the average value of the groove width of all circumferential direction grooves on the vehicle inner side to the groove width of the circumferential direction groove having the greatest width on the vehicle inner side, with respect to the ground contact width, be greater on the rear wheel side than on the front wheel side, the difference in the ratio of the circumferential direction grooves, calculated as a percentage, being not less than 4 and not more than 10. As such, this enables the steering stability performance on the dry road surface to be improved on the rear wheel side by reducing the groove surface area on the vehicle outer side, while also improving the steering stability performance on the wet road surface while maintaining the steering stability performance on the dry road surface. This enables the remarkable effect of improvement to the steering stability performance on the dry road surface and the wet road surface to be obtained.

In addition, in pneumatic tire mount method of the present technology, each of the pneumatic tires arranged on the front wheel side and on the rear wheel side has the total groove surface area of the lug grooves on the front wheel side be greater on the vehicle outer side than on the vehicle inner side, and has the total groove surface area of the lug grooves on the rear wheel side be greater on the vehicle inner side than on the vehicle outer side.

According to this pneumatic tire mount method, the steering stability performance on the wet road surface may be improved on the front wheel side, and the steering stability performance on the dry road surface may be improved on the rear wheel side. As a result, a remarkable improvement effect in steering stability performance on the dry road surface and the wet road surface may be obtained.

In order to solve the above-described problem and to achieve the object, any one of the above-described pneumatic tire mount methods is applicable to a combination pneumatic tire, where upon being mounted on the vehicle, the combination pneumatic tire of the present technology is designated with the orientation of the vehicle inner side and the vehicle outer side with respect to the left and right sides of the vehicle, and is designated with the position on the front wheel side and the rear wheel side of the vehicle.

Having the total groove surface area ratio in the ground contact width of the pneumatic tires arranged on the rear wheel side be less than 20% leads to excessive steering stability performance on the dry road surface and causes a difficulty in supplementing the steering stability performance on the wet road surface. Conversely, having the total groove surface area ratio exceed 27% poses a difficulty in securing steering stability performance on the dry road surface. In addition, having the groove surface area ratio on the vehicle outer side be smaller with respect to the vehicle inner side with respect to the ground contact width of the pneumatic tires arranged on the front wheel side and on the rear wheel side, and having the difference in the groove surface area ratio, calculated as a percentage, be less than 7 leads to excessive steering stability performance on the wet road surface and causes a decrease in the steering stability performance on the dry road surface. Conversely, having the difference exceed 15 leads to excessive steering stability performance on the dry road surface and poses a difficulty in supplementing the steering stability performance on the wet road surface. In addition, having the total groove surface area ratio in the ground contact width of the pneumatic tires arranged on the front wheel side and on the rear wheel side be greater on the front wheel side than on the rear wheel side, and having the difference in the total groove surface area ratio, calculated as a percentage, be less than 3, leads to excessive steering stability performance on the dry road surface and poses a difficulty in supplementing the steering stability performance on the wet road surface. Conversely, having the difference exceed 10 leads to excessive steering stability performance on the wet road surface and decreases the steering stability performance on the dry road surface. In addition, having the ratio of the average value of the groove width of all the circumferential direction grooves on the vehicle inner side to the groove width of the circumferential groove having the greatest width on the vehicle inner side, in the ground contact width of the pneumatic tires arranged on the front wheel side and on the rear wheel side, be greater on the rear wheel side than on the front wheel side, and having the difference in the ratio of the circumferential direction grooves, calculated as a percentage, be less than 1%, leads to excessive steering stability performance on the dry road surface and poses a difficulty in supplementing the steering stability performance on the wet road surface. Conversely, having the difference exceed 10% leads to excessive steering stability performance on the wet road surface and decreases the steering stability performance on the dry road surface. In addition, having the ratio of the total groove surface area of the lug grooves on the vehicle outer side to the total groove surface area of the lug grooves on the vehicle inner side, in the ground contact width of the pneumatic tires mounted on the front wheel side and on the rear wheel side, be greater on the front wheel side than on the rear wheel side, and having the difference in the total groove surface area ratio of the lug grooves, calculated as a percentage, be less than 6 leads to excessive steering stability performance on the dry road surface and poses a difficulty in supplementing the steering stability performance on the wet road surface. Conversely, having the difference exceed 20 leads to excessive steering stability performance on the wet road surface and decreases the steering stability performance on the dry road surface. As a result, according to the combination pneumatic tire of the present technology, steering stability performance on both the dry road surface and on the wet road surface are achieved to a high degree.

According to the present technology, steering stability performance on both a dry road surface and a wet road surface may be achieved to a high degree.

BRIEF DESCRIPTION OF THE DRAWING(S)

FIGS. 3A-3B is a table showing results of performance testing of pneumatic tires according to examples of the present technology.

DETAILED DESCRIPTION

An embodiment of the present technology is described in detail below, with reference to the accompanying drawings. However, the technology is not limited to the embodiment. Further, the components of the embodiment include components easily replaceable by those skilled in the art, and substantially identical components. Furthermore, a plurality of modified examples described in the embodiment may be freely combined within the scope of obviousness to those skilled in the art.

Here, a combination pneumatic tire of the present embodiment is applicable to four wheels, namely to left and right wheels, to a front wheel, and to a rear wheel.

Figure 1:
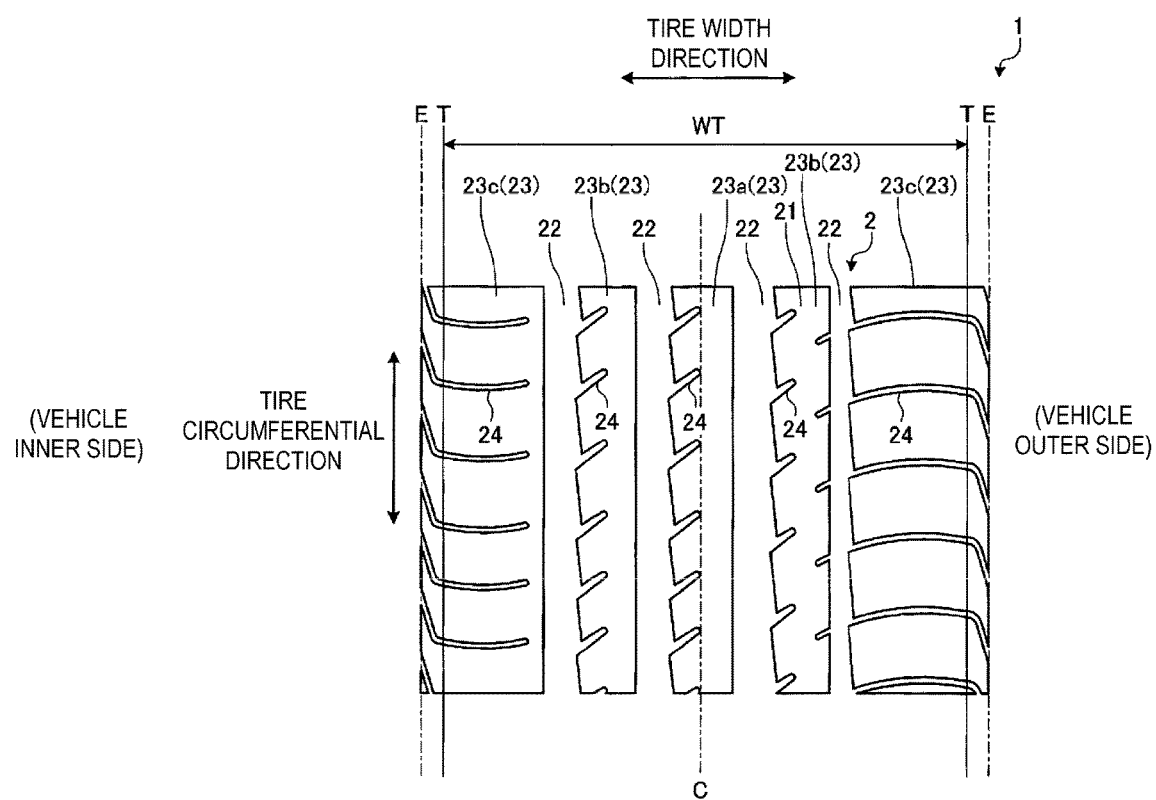
FIG. 1 is a plan view of a pneumatic tire on a front wheel side, pertaining to an embodiment of the present technology.
Figure 2:
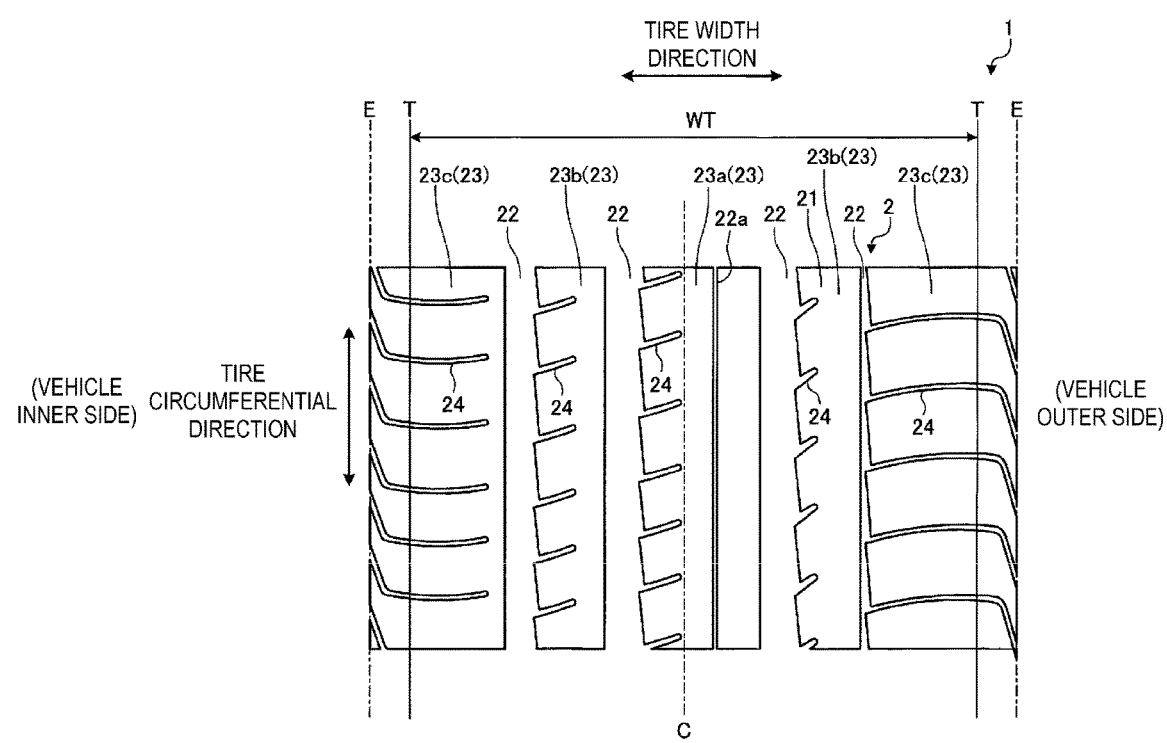
FIG. 2 is a plan view of a pneumatic tire on a rear wheel side, pertaining to the embodiment of the present technology.

FIG. 1 is a plan view of a front wheel side of a combination pneumatic tire pertaining to the present embodiment. FIG. 2 is a plan view of a rear wheel side of the combination pneumatic tire pertaining to the present embodiment.

In the following description, the term "tire radial direction" refers to a direction orthogonal to a rotational axis (not illustrated in the drawings) of a pneumatic tire 1. The phrase "inner side in the tire radial direction" refers to a side facing the rotational axis with respect to the tire radial direction, and the phrase "outer side in the tire radial direction" refers to a side distanced from the rotational axis with respect to the tire radial direction. In addition, the term "tire width direction" refers to a direction parallel to the rotational axis. The phrase "inner side in the tire width direction" refers to a side facing a tire equatorial plane (tire equatorial line) C with respect to the tire width direction, and the phrase "outer side in the tire width direction" refers to a side distanced from the tire equatorial plane C with respect to the tire width direction. Furthermore, the phrase "tire circumferential direction" refers to a circumferential direction with the rotational axis as a center axis. In addition, the tire equatorial plane C is a plane that is orthogonal to the rotational axis of the pneumatic tire 1, and passes through the center of the pneumatic tire 1 in the tire width direction. The term "tire equatorial line" refers to a line along the circumferential direction of the pneumatic tire 1 that lies on the tire equatorial plane C. In the present technology, the tire equatorial line is labeled C, identically to the tire equatorial plane.

Furthermore, in a situation where the pneumatic tire 1 of the present embodiment is mounted on a vehicle (not illustrated in the drawings), an orientation with respect to the tire width direction (lateral direction of the vehicle) of a vehicle inner side and a vehicle outer side is designated. Although the designation of orientation is not explicitly illustrated in the drawings, the orientation is indicated, for example, by a sign provided on sidewall portions of the pneumatic tire 1. In the following, in a situation where the tire is mounted on the vehicle, the term "vehicle inner side" refers to a side facing the inner side of the vehicle, and the term "vehicle outer side" refers to a side facing the outer side of the vehicle. Here, the designations of the vehicle inner side and the vehicle outer side are not limited to the situation where the tire is mounted on the vehicle. For example, in a situation where the tire is assembled on a rim, the orientation of the rim is determined with respect to the inner side and the outer side of the vehicle in the tire width direction. As such, in a situation where the pneumatic tire 1 is assembled on a rim, the orientation is designated with respect to the inner side (vehicle inner side) and the outer side (vehicle outer side) of the vehicle in the tire width direction. In addition, with respect to a tread portion 2, the term "vehicle inner side" refers to a range on the inner side of the vehicle relative to the tire equatorial plane C when mounted on the vehicle, and the term "vehicle outer side" refers to a range on the outer side of the vehicle relative to the tire equatorial plane C when mounted on the vehicle.

In addition, in a situation where the pneumatic tire 1 of the present embodiment is mounted on a vehicle (not illustrated in the drawings), a position of the tire is designated with respect to a front wheel side and a rear wheel side of the vehicle. The designated position is not explicitly illustrated in the drawings. However, the designated position may be indicated from the cross-sectional width and the aspect ratio of the tire, which corresponds to the tire size. For example, the designated position may be the front wheel side for a smaller cross-sectional width tire and the rear wheel side for a larger cross-sectional width tire. In addition, the designated position may be the front wheel side for a larger aspect ratio tire and the rear wheel side for a smaller aspect ratio tire. Furthermore, although the designated position is not explicitly illustrated in the drawings, the position may be indicated, for example, by a sign provided on the side walls of the pneumatic tire 1.

Here, the cross-sectional width is the width as measured with the tire being mounted on a regular rim, filled to a regular inner pressure, in an unloaded state (regular load=0), and excluding any patterns or writing on a tire side face. Here, the term "aspect ratio" refers the ratio of the cross-sectional height to the cross-sectional width of the tire. The term "cross-sectional height" refers to one-half of the difference between the outer diameter and the rim diameter of the tire.

In addition, the term "regular rim" refers to a standard rim as defined by The Japan Automobile Tyre Manufacturers Association (JATMA), to a Design Rim as defined by Tire and Rim Association (TRA), or to a Measuring Rim as defined by European Tyre and Rim Technical Organisation (ETRTO). The term "regular inner pressure" refers to a maximum air pressure as stipulated by JATMA, to a maximum value in the document Tire Load Limits at Various Cold Inflation Pressures as defined by the TRA, or to an inflation pressure as stipulated by ETRTO. Here, the term "regular load" refers to a maximum load capacity as stipulated by JATMA, to a maximum value in the document Tire Load Limits at Various Cold Inflation Pressures as defined by the TRA, or to a load capacity as stipulated by ETRTO.

The pneumatic tire 1 on the front wheel side has the tread portion 2, as illustrated in FIG. 1. The tread portion 2 is formed from a rubber material and is exposed at the outermost side in the tire radial direction of the pneumatic tire 1. Also, a surface (hereinafter termed tread surface) 21 of the tread portion 2 forms a contour of the pneumatic tire 1.

A plurality of circumferential direction grooves 22 extending in the tire circumferential direction are provided on the tread surface 21, being arranged in parallel in the tire width direction. At least one of the circumferential direction grooves 22 is provided on the tread surface 21 on each of the vehicle inner side and the vehicle outer side, on each side of the tire equatorial plane C. In the present embodiment, four of the circumferential direction grooves 22 are provided on the tread surface 21. In addition, in the present embodiment, one of the circumferential direction grooves 22 on the vehicle outer side on the outermost side in the tire width direction is formed so as to have the smallest groove width in comparison to the other circumferential direction grooves 22. In addition, on the vehicle inner side, one of the circumferential direction grooves 22 that is closest to the tire equatorial plane C is formed so as to have the largest groove width in comparison to the other circumferential direction grooves 22. Then, at least three (five in the present embodiment) land portions 23 are formed on the tread surface 21 by the plurality of circumferential direction grooves 22, as rib shapes extending along the tire circumferential direction. In addition, lug grooves 24 each having an edge component in the tire circumferential direction are formed on the land portions 23 so as to intersect the circumferential direction grooves 22, being arranged in parallel in the tire circumferential direction.

In the present embodiment, the lug grooves 24 in a central land portion 23a formed over the tire equatorial plane C each have one end that is continuous with one of the circumferential direction grooves 22 on one side (the vehicle inner side), and the other end extending diagonally with respect to the tire width direction toward the one of the circumferential direction grooves 22 that is smallest in terms of groove width. Each of the lug grooves 24 has a shape that is closed on one end, as the other end is not continuous with the circumferential direction groove 22 on the other side (vehicle outer side). Here, an opening edge of the circumferential direction groove 22 that is continuous with the one end of each of the lug grooves 24 is formed diagonally with respect to the tire circumferential direction between the lug grooves 24. In addition, an opening edge of the circumferential direction groove 22 on the other side (the vehicle outer side) that is not continuous with the lug grooves 24 is formed in parallel to the tire equatorial plane C.

Also, in the present embodiment, the lug grooves 24 in middle land portions 23b on both sides of the central land portion 23a in the tire width direction each have one end that is continuous with one of the circumferential direction grooves 22 on one side (the vehicle inner side), and the other end extending diagonally with respect to the tire width direction toward the one of the circumferential direction grooves 22 that is smallest in terms of groove width. Each of the lug grooves 24 has a shape that is closed on one end, as the other end is not continuous with the circumferential direction groove 22 on the other side (vehicle outer side). Here, the opening edge of the circumferential direction groove 22 that is continuous with the one end of each of the lug grooves 24 is formed diagonally with respect to the tire circumferential direction between the lug grooves 24. In addition, the opening edge of the circumferential direction groove 22 on the other side (the vehicle outer side) that is not continuous with the lug grooves 24 is formed in parallel to the tire equatorial plane C.

In addition, in the present embodiment, the lug grooves 24 in an outside land portion 23c (on the vehicle outer side) on the outermost side in the tire width direction formed by the circumferential direction groove 22 that is smallest in terms of groove width are each formed so as to pass through one of the circumferential direction grooves 22, and have a shape that is closed on the end on the inner side in the tire width direction, near the middle land portion 23b neighboring the outside land portion 23c. In these lug grooves 24, the end that is closed on the inner side in the tire width direction is formed independently and non-continuously among the lug grooves 24 in the middle land portion 23b. Here, an opening edge of the circumferential direction groove 22 on the outermost side in the tire width direction that is continuous with the lug grooves 24 in the outside land portion 23c is formed diagonally with respect to the tire circumferential direction between the lug grooves 24. In addition, an opening edge of the circumferential direction groove 22 on the side where the lug grooves 24 pass through is formed in parallel to the tire equatorial plane C.

In addition, in the present embodiment, the lug grooves 24 in another outside land portion 23c (on the vehicle inner side) on the outermost side in the tire width direction are formed so as to be closed on the end on the inner side in the tire width direction and are not continuous with the circumferential direction groove 22.

In addition, the lug grooves 24 provided in the outside land potions 23c each have an end portion on the outer side in the tire width direction formed so as to be bent in the tire circumferential direction. Here, in the present embodiment, an outermost edge (tire design edge) E in the tire width direction of the tread portion 2 is defined as a position on the edge of the outer side in the tire width direction where the lug grooves 24 are formed in the outside land portions 23c. Then, the lug grooves 24 provided in the other outside land portion 23c (on the vehicle inner side) that is on the outermost side in the tire width direction have dimensions in the tire width direction of not less than 60% of the dimensions in the tire width direction from the opening edge of the circumferential direction groove 22 on the other side (the vehicle outer side) to the outermost edge (the tire design edge) E in the tire width direction.

Here, the lug grooves 24 need only be provided at least in the outside land portions 23c.

On the other side, as illustrated in FIG. 2, the pneumatic tire 1 on the rear wheel side also has the tread portion 2. The tread portion 2 is formed from a rubber material and is exposed at the outermost side in the tire radial direction of the pneumatic tire 1. Also, a surface (hereinafter termed tread surface) 21 of the tread portion 2 forms the contour of the pneumatic tire 1.

The plurality of circumferential direction grooves 22 extending in the tire circumferential direction are provided on the tread surface 21, being arranged in parallel in the tire width direction. At least one of the circumferential direction grooves 22 is provided on the tread surface 21 on each of the vehicle inner side and the vehicle outer side, on each side of the tire equatorial plane C. In the present embodiment, four of the circumferential direction grooves 22 are provided on the tread surface 21. In addition, in the present embodiment, one of the circumferential direction grooves 22 on the vehicle outer side on the outermost side in the tire width direction is formed so as to have the smallest groove width in comparison to the other circumferential direction grooves 22. In addition, on the vehicle inner side, one of the circumferential direction grooves 22 that is closest to the tire equatorial plane C is formed so as to have the largest groove width in comparison to the other circumferential direction grooves 22. Then, at least three (five in the present embodiment) land portions 23 are formed on the tread surface 21 by the plurality of circumferential direction grooves 22, as rib shapes extending along the tire circumferential direction. In addition, a narrow circumferential direction groove 22a is formed on the tread surface 21 on the vehicle outer side of the central land portion 23a formed on the tire equatorial plane C. This narrow circumferential direction groove 22a is substantially included among the circumferential direction grooves 22. However, the narrow circumferential direction groove 22a has a smaller groove width than the circumferential direction groove 22 on the outermost side in the tire width direction on the vehicle outer side, described above. In addition, lug grooves 24 each having an edge component in the tire circumferential direction are formed on the land portions 23 so as to intersect the circumferential direction grooves 22, being arranged in parallel in the tire circumferential direction.

In the present embodiment, the lug grooves 24 in a central land portion 23a formed over the tire equatorial plane C each have one end that is continuous with one of the circumferential direction grooves 22 on one side (the vehicle inner side), and the other end extending diagonally with respect to the tire width direction toward the one of the circumferential direction grooves 22 that is smallest in terms of groove width. Each of the lug grooves 24 has a shape that is closed on one end, as the other end is not continuous with the circumferential direction grooves 22 on the other side (vehicle outer side). Here, an opening edge of the circumferential direction groove 22 that is continuous with the one end of each of the lug grooves 24 is formed diagonally with respect to the tire circumferential direction between the lug grooves 24. In addition, an opening edge of the circumferential direction groove 22 on the other side (the vehicle outer side) that is not continuous with the lug grooves 24 is formed in parallel to the tire equatorial plane C.

Also, in the present embodiment, the lug grooves 24 in the middle land portions 23b on both sides of the central land portion 23a in the tire width direction each have one end that is continuous with one of the circumferential direction grooves 22 on one side (the vehicle inner side), and the other end extending diagonally with respect to the tire width direction toward the one of the circumferential direction grooves 22 that is smallest in terms of groove width. Each of the lug grooves 24 has a shape that is closed on one end, as the other end is not continuous with the circumferential direction grooves 22 on the other side (vehicle outer side). Here, an opening edge of the circumferential direction groove 22 that is continuous with the one end of each of the lug grooves 24 is formed diagonally with respect to the tire circumferential direction between the lug grooves 24. In addition, an opening edge of the circumferential direction groove 22 on the other side (the vehicle outer side) that is not continuous with the lug grooves 24 is formed in parallel to the tire equatorial plane C.

In addition, in the present embodiment, the lug grooves 24 in the outside land portion 23c (on the vehicle outer side) on the outermost side in the tire width direction formed by the circumferential direction groove 22 that is smallest in terms of groove width are each formed so as to pass through the circumferential direction grooves 22. Here, the opening edge of the circumferential direction groove 22 on the outermost side in the tire width direction that is continuous with the lug grooves 24 in the outside land portion 23c is formed diagonally with respect to the tire circumferential direction between the lug grooves 24.

In addition, in the present embodiment, the lug grooves 24 in another outside land portion 23c (on the vehicle inner side) on the outermost side in the tire width direction are formed so as to be closed on the end on the inner side in the tire width direction and are not continuous with the circumferential direction groove 22.

In addition, the lug grooves 24 provided in the outside land potions 23c each have an end portion on the outer side in the tire width direction formed so as to be bent in the tire circumferential direction. Here, in the present embodiment, the outermost edge (tire design edge) E in the tire width direction of the tread portion 2 is defined as the position on the edge of the outer side in the tire width direction where the lug grooves 24 are formed in the outside land portions 23c. Then, the lug grooves 24 provided in the other outside land portion 23c (on the vehicle inner side) that is on the outermost side in the tire width direction have dimensions in the tire width direction of not less than 60% of the dimensions in the tire width direction from the opening edge of the circumferential direction groove 22 on the other side (the vehicle outer side) to the outermost edge (the tire design edge) E in the tire width direction.

Here, the lug grooves 24 need only be provided at least in the outside land portions 23c.

Then, in the above-described combination pneumatic tire, each of the pneumatic tires 1 arranged on the rear wheel side as illustrated in FIG. 2 has a total groove surface area ratio of not less than 20% and not more than 27% with respect to a ground contact width WT. That is, within the range of the ground contact width WT, the value of the groove surface area ratio, calculated as a percentage, of surface area occupied by all grooves 22, 22a, 24 formed in the tread surface 21 relative to the tread surface 21 is not less than 20% and not more than 27%. Here, the groove surface area is an open surface area of the grooves that is open in the tread surface 21.

The ground contact width WT is explained next. Given the pneumatic tire 1 assembled on a regular rim, filled to a regular inner pressure, and with 70% of a regular load applied, a region of the tread surface 21 of the pneumatic tire 1 in contact with the ground on a flat surface is defined as a ground contact region. Each of the both outermost edges of the ground contact region in the tire width direction is defined as a ground contact edge T. Here, the ground contact edge T is illustrated in FIG. 1 and FIG. 2 as being continuous in the tire circumferential direction. Then, the ground contact width WT is an interval between the both ground contact edges T in the tire width direction.

In addition, the pneumatic tires 1 arranged on the front wheel side and on the rear wheel side as illustrated in FIG. 1 and FIG. 2 are formed such that the groove surface area ratio is smaller on the vehicle outer side than on the vehicle inner side with respect to the ground contact width, and such that the difference in the groove surface area ratio, calculated as a percentage, is not less than 7 and not more than 15.

In addition, the pneumatic tires 1 arranged on the front wheel side and on the rear wheel side are formed such that the total groove surface area ratio is greater on the front wheel side than on the rear wheel side with respect to the ground contact width WT, and such that the difference in the total groove surface area ratio, calculated as a percentage, is not less than 3 and not more than 10.

In addition, the pneumatic tires 1 arranged on the front wheel side and on the rear wheel side are formed such that the ratio of respective average values of the groove width of all of the circumferential direction grooves 22 (including the narrow circumferential direction groove 22a) on the vehicle inner side to the groove width of the circumferential direction groove 22 having the greatest width on the vehicle inner side, with respect to the ground contact width WT, is greater on the rear wheel side than on the front wheel side, and such that the difference in the ratio of the circumferential direction grooves 22, calculated as a percentage, is not less than 1 and not more than 10.

In addition, the pneumatic tires 1 arranged on the front wheel side and on the rear wheel side are formed such that a ratio of total groove surface area of the lug grooves 24 on the vehicle outer side to the total groove surface area of the lug grooves 24 on the vehicle inner side, with respect to the ground contact width WT, is greater on the front wheel side than on the rear wheel side, and such that the difference in the total groove surface area ratio of the lug grooves 24, calculated as a percentage, is not less than 6 and not more than 20.

As such, the combination pneumatic tire of the present embodiment is a combination pneumatic tire in which the orientation of the vehicle inner side and the vehicle outer side with respect to the left and right sides of the vehicle is designated, and the position on the front wheel side and the rear wheel side of the vehicle is designated upon being mounted on the vehicle. Then, each pneumatic tire 1 is provided with at least one circumferential direction groove 22 formed in the tread surface 21 on the vehicle inner side and vehicle outer side of the tire equatorial plane C, and extending in the tire circumferential direction. Each pneumatic tire 1 is also provided with a plurality of lug grooves 24 formed in the tire circumferential direction, extending in a direction orthogonal to the circumferential direction groove 22, at least on the tread surface 21 of the outside land portion 23c on an outermost side in the tire width direction, among the land portions 23 partitioned by the circumferential direction groove 22 and extending in the tire circumferential direction. Each pneumatic tire 1 arranged on the rear wheel side has a total groove surface area ratio with respect to the ground contact width WT of not less than 20% and not more than 27%. Also, each pneumatic tire 1 arranged on the front wheel side and on the rear wheel side has a groove surface area ratio that is smaller on the vehicle outer side than on the vehicle inner side, with respect to the ground contact width WT, a difference in the groove surface area ratio, calculated as a percentage, being not less than 7 and not more than 15. In addition, each pneumatic tire 1 arranged on the front wheel side and on the rear wheel side has the total groove surface area ratio with respect to the ground contact width WT that is greater on the front wheel side than on the rear wheel side, a difference in the total groove surface area ratio, calculated as a percentage, being not less than 3 and not more than 10. Also, each pneumatic tire 1 arranged on the front wheel side and on the rear wheel side has a ratio of an average value of the groove width of all circumferential direction grooves 22 on the vehicle inner side to the groove width of the circumferential direction groove 22 having the greatest width on the vehicle inner side, with respect to the ground contact width WT, that is greater on the rear wheel side than on the front wheel side, a difference in the ratio of the circumferential direction grooves 22, calculated as a percentage, being not less than 1 and not more than 10. In addition, each pneumatic tire 1 arranged on the front wheel side and on the rear wheel side has a ratio of the total groove surface area of the lug grooves 24 on the vehicle outer side to the total groove surface area of the lug grooves 24 on the vehicle inner side, with respect to the ground contact width WT, that is greater on the front wheel side than on the rear wheel side, a difference in the total groove surface area ratio of the lug grooves 24, calculated as a percentage, being not less than 6 and not more than 20.

Also, a pneumatic tire mount method of the present embodiment is a pneumatic tire mount method used with the pneumatic tire 1 mounted on a vehicle, determining the orientation on the inner side and the outer side with respect to the left and right sides of the vehicle for the pneumatic tire 1, and determining the position on the front wheel side and on the rear wheel side of the vehicle. Then, each pneumatic tire 1 is provided with at least one circumferential direction groove 22 formed in the tread surface 21 on the vehicle inner side and vehicle outer side of the tire equatorial plane C, and extending in the tire circumferential direction. Each pneumatic tire 1 is also provided with a plurality of lug grooves 24 formed in the tire circumferential direction, extending in a direction orthogonal to the circumferential direction groove 22, at least on the tread surface 21 of the outside land portion 23c on an outermost side in the tire width direction, among the land portions 23 partitioned by the circumferential direction groove 22 and extending in the tire circumferential direction. Each pneumatic tire 1 arranged on the rear wheel side has a total groove surface area ratio with respect to the ground contact width WT of not less than 20% and not more than 27%. Also, each pneumatic tire 1 arranged on the front wheel side and on the rear wheel side has a groove surface area ratio that is smaller on the vehicle outer side than on the vehicle inner side, with respect to the ground contact width WT, a difference in the groove surface area ratio, calculated as a percentage, being not less than 7 and not more than 15. In addition, each pneumatic tire 1 arranged on the front wheel side and on the rear wheel side has the total groove surface area ratio with respect to the ground contact width WT that is greater on the front wheel side than on the rear wheel side, a difference in the total groove surface area ratio, calculated as a percentage, being not less than 3 and not more than 10. Also, each pneumatic tire 1 arranged on the front wheel side and on the rear wheel side has a ratio of an average value of the groove width of all circumferential direction grooves 22 on the vehicle inner side to the groove width of the circumferential direction groove 22 having the greatest width on the vehicle inner side, with respect to the ground contact width WT, that is greater on the rear wheel side than on the front wheel side, a difference in the ratio of the circumferential direction grooves 22, calculated as a percentage, being not less than 1 and not more than 10. In addition, each pneumatic tire 1 arranged on the front wheel side and on the rear wheel side has a ratio of the total groove surface area of the lug grooves 24 on the vehicle outer side to the total groove surface area of the lug grooves 24 on the vehicle inner side, with respect to the ground contact width WT, that is greater on the front wheel side than on the rear wheel side, a difference in the total groove surface area ratio of the lug grooves 24, calculated as a percentage, being not less than 6 and not more than 20.

Typical methods of providing steering stability performance on both the dry road surface and the wet road surface include enlarging the groove surface area on the vehicle inner side, or enlarging the groove surface area on the front wheel side. However, in consideration of increasing demand for steering stability performance on the dry road surface, there is a need to decrease the absolute value of the groove surface area. Nevertheless, doing so has a tendency to create difficulty in securing steering stability performance on the wet road surface. However, in the present embodiment, in terms of steering stability performance on the wet road surface, there has been a discovery that a great improvement to the steering stability performance on the wet road surface is imparted by the groove surface area of the lug grooves 24 on the vehicle outer side for the front wheel side, and by the groove surface area of the circumferential direction grooves 22 on the vehicle inner side for the rear wheel side.

As such, the pneumatic tire mount method and the combination pneumatic tire of the present technology comprise the following. In order to improve the steering stability performance on the dry road surface, each pneumatic tire 1 arranged on the rear wheel side has a total groove surface area ratio with respect to the ground contact width WT of not less than 20% and not more than 27%. In accordance with conventional methods, each pneumatic tire 1 arranged on the front wheel side and on the rear wheel side has a groove surface area ratio that is smaller on the vehicle outer side than on the vehicle inner side, with respect to the ground contact width WT, the difference in the groove surface area ratio, calculated as a percentage, being not less than 7 and not more than 15. Also, each pneumatic tire 1 arranged on the front wheel side and on the rear wheel side has the total groove surface area ratio with respect to the ground contact width WT that is greater on the front wheel side than on the rear wheel side, the difference in the total groove surface area ratio, calculated as a percentage, being not less than 3 and not more than 10. Furthermore, in order to further enhance the steering stability performance on the wet road surface, each pneumatic tire 1 arranged on the front wheel side and on the rear wheel side has the ratio of the average value of the groove width of all circumferential direction grooves 22 on the vehicle inner side to the groove width of the circumferential direction groove 22 having the greatest width on the vehicle inner side, with respect to the ground contact width WT, that is greater on the rear wheel side than on the front wheel side, a difference in the ratio of the circumferential direction grooves 22, calculated as a percentage, being not less than 1 and not more than 10. Also, each pneumatic tire 1 arranged on the front wheel side and on the rear wheel side has the ratio of the total groove surface area of the lug grooves 24 on the vehicle outer side to the total groove surface area of the lug grooves 24 on the vehicle inner side, with respect to the ground contact width WT, that is greater on the front wheel side than on the rear wheel side, a difference in the total groove surface area ratio of the lug grooves 24, calculated as a percentage, being not less than 6 and not more than 20.

Here, having the total groove surface area ratio in the ground contact width WT of the pneumatic tires 1 arranged on the rear wheel side be less than 20% leads to excessive steering stability performance on the dry road surface and causes a difficulty in supplementing the steering stability performance on the wet road surface. Conversely, having the total groove surface area ratio exceed 27% poses a difficulty in securing steering stability performance on the dry road surface.

In addition, having the groove surface area ratio on the vehicle outer side be smaller with respect to the vehicle inner side with respect to the ground contact width WT of the pneumatic tires 1 arranged on the front wheel side and on the rear wheel side, and having the difference in the groove surface area ratio, calculated as a percentage, be less than 7 leads to excessive steering stability performance on the wet road surface and causes a decrease in the steering stability performance on the dry road surface. Conversely, having the difference exceed 15 leads to excessive steering stability performance on the dry road surface and poses a difficulty in supplementing the steering stability performance on the wet road surface.

In addition, having the total groove surface area ratio in the ground contact width WT of the pneumatic tires 1 arranged on the front wheel side and on the rear wheel side be greater on the front wheel side than on the rear wheel side, and having the difference in the total groove surface area ratio, calculated as a percentage, be less than 3, leads to excessive steering stability performance on the dry road surface and poses a difficulty in supplementing the steering stability performance on the wet road surface. Conversely, having the difference exceed 10 leads to excessive steering stability performance on the wet road surface and decreases the steering stability performance on the dry road surface.

In addition, having the ratio of the average value of the groove width of all the circumferential direction grooves 22 on the vehicle inner side to the groove width of the circumferential direction groove 22 having the greatest width on the vehicle inner side, in the ground contact width WT of the pneumatic tires 1 arranged on the front wheel side and on the rear wheel side, be greater on the rear wheel side than on the front wheel side, and having the difference in the ratio of the circumferential direction grooves 22, calculated as a percentage, be less than 1, leads to excessive steering stability performance on the dry road surface and poses a difficulty in supplementing the steering stability performance on the wet road surface. Conversely, having the difference exceed 10 leads to excessive steering stability performance on the wet road surface and decreases the steering stability performance on the dry road surface.

In addition, having the ratio of the total groove surface area of the lug grooves 24 on the vehicle outer side to the total groove surface area of the lug grooves 24 on the vehicle inner side, in the ground contact width WT of the pneumatic tires 1 mounted on the front wheel side and on the rear wheel side, be greater on the front wheel side than on the rear wheel side, and having the difference in the total groove surface area ratio of the lug grooves 24, calculated as a percentage, be smaller than 6 leads to excessive steering stability performance on the dry road surface and poses a difficulty in supplementing the steering stability performance on the wet road surface. Conversely, having the difference exceed 20 leads to excessive steering stability performance on the wet road surface and decreases the steering stability performance on the dry road surface.

As a result, according to the pneumatic tire mount method and the combination pneumatic tire of the present embodiment, steering stability performance on both the dry road surface and on the wet road surface are achieved to a high degree.

In addition, the pneumatic tire mount method and the combination pneumatic tire of the present embodiment preferably comprise the following. Each pneumatic tire 1 arranged on the front wheel side and on the rear wheel side has a ratio of the groove width of the circumferential direction groove 22 having the greatest width on the vehicle outer side of the front wheel side to the ground contact width WT, calculated as a percentage, that is not less than 7% and not more than 9%, and has the ratio of the groove width of the circumferential direction groove 22 having the greatest width on the vehicle outer side of the rear wheel side to the ground contact width WT, calculated as a percentage, that is not less than 6% and not more than 8%. Also, a difference in the ratio of the circumferential direction groove 22 having the greatest width on the vehicle outer side to the ground contact width WT, calculated as a percentage, between the front wheel side and the rear wheel side is within 1%. Additionally, the ratio of the average value of the groove width of all circumferential direction grooves 22 on the vehicle inner side to the groove width of the circumferential direction groove 22 having the greatest width on the vehicle inner side, with respect to the ground contact width WT, is greater on the rear wheel side than on the front wheel side, the difference in the ratio of the circumferential direction grooves 22, calculated as a percentage, being not less than 4 and not more than 10.

According to the pneumatic tire mount method and the combination pneumatic tire of the present embodiment, the groove width of the circumferential direction groove 22 having the greatest width on the vehicle outer side of the front wheel side is relatively large, and each pneumatic tire 1 arranged on the front wheel side and on the rear wheel side has the ratio of the average value of the groove width of all circumferential direction grooves 22 on the vehicle inner side to the groove width of the circumferential direction groove 22 having the greatest width on the vehicle inner side, with respect to the ground contact width WT, be greater on the rear wheel side than on the front wheel side, the difference in the ratio of the circumferential direction grooves 22, calculated as a percentage, being not less than 4 and not more than 10. As such, this enables the steering stability performance on the dry road surface to be improved on the rear wheel side by reducing the groove surface area on the vehicle outer side, while also improving the steering stability performance on the wet road surface while maintaining the steering stability performance on the dry road surface. This enables the remarkable effect of improvement to the steering stability performance on the dry road surface and the wet road surface to be obtained.

In addition, the pneumatic tire mount method and the combination pneumatic tire of the present embodiment preferably comprise the following. Each pneumatic tire 1 arranged on the front wheel side and on the rear wheel side has the total groove surface area of the lug grooves 24 on the front wheel side be greater on the vehicle outer side than on the vehicle inner side, and has the total groove surface area of the lug grooves 24 on the rear wheel side be greater on the vehicle inner side than on the vehicle outer side. That is, on the front wheel side, the ratio of the total groove surface area of the lug grooves 24 on the vehicle outer side to the total groove surface area of the lug grooves 24 on the vehicle inner side, with respect to the ground contact width WT, calculated as a percentage, exceeds 100%. Conversely, on the rear wheel side, the ratio of the total groove surface area of the lug grooves 24 on the vehicle outer side to the total groove surface area of the lug grooves 24 on the vehicle inner side, with respect to the ground contact width WT, calculated as a percentage, is less than 100%.

According to this pneumatic tire mount method and combination pneumatic tire, the steering stability performance on the wet road surface may be improved on the front wheel side, and the steering stability performance on the dry road surface may be improved on the rear wheel side. As a result, a remarkable improvement effect in steering stability performance on the dry road surface and the wet road surface may be obtained.

EXAMPLES

In the present examples, performance testing pertaining to steering stability performance on the dry road surface and to steering stability performance on the wet road surface were performed on various types of the combination pneumatic tire under different conditions (see FIGS. 3A-3B).

For this performance testing, pneumatic tires having tire size 275/40ZR20 assembled on a 20×9.0 J rim for the front wheel side and pneumatic tires having tire size 315/35ZR20 assembled on a 20×11.50 J rim for the rear wheel side were combined as a unit. The pneumatic tires had an air pressure that is a regular inner pressure (230 kPa) and were mounted on a testing vehicle (3600 cc: Front engine drive four-wheeled passenger vehicle).

The evaluation method for the steering stability performance on the dry road surface involved driving the above-described testing vehicle on a dry testing course, and having one experienced test driver perform a sensory evaluation pertaining to stability during steering while changing lanes and while cornering, as well as during straight movement. The sensory evaluation is an average of five evaluations, evaluated with a conventional pneumatic tire as a standard (100). In this evaluation, a greater index value indicates superior steering stability performance on the dry road surface.

The evaluation method for the steering stability performance on the wet road surface involved driving the above-described testing vehicle on a wet testing course with a water depth of 3 mm, and having one experienced test driver perform a sensory evaluation pertaining to stability during steering while changing lanes and while cornering, as well as during straight movement. The sensory evaluation is an average of five evaluations, evaluated with a conventional pneumatic tire as a standard (100). In this evaluation, a greater index value indicates superior steering stability performance on the wet road surface.

As illustrated in FIG. 1 and FIG. 2, the combination pneumatic tires of Working Example 1 to Working Example 13, the Conventional Example, and Comparative Example 1 to Comparative Example 3 have, on each of the pneumatic tires, two of the circumferential grooves respectively formed on the tread surface on the vehicle inner side and the vehicle outer side, extending in the tire circumferential direction, of the tire equatorial plane. Also, a plurality of the lug grooves formed in the tire circumferential direction and extending in a direction orthogonal to the circumferential direction grooves are provided on the tread surface of at least the outside land portion on the outermost side in the tire width direction, among the land portions partitioned by the circumferential direction grooves and extending in the tire circumferential direction.

Then, as illustrated in FIGS. 3A-3B, the following applies to the combination pneumatic tires of Working Example 1 to Working Example 13. The pneumatic tires arranged on the rear wheel side have a total groove surface area ratio in the ground contact width of not less than 20% and not more than 27%. Also, the pneumatic tires arranged on the front wheel side and on the rear wheel side have a groove surface area ratio that is smaller on the vehicle outer side than on the vehicle inner side in the ground contact width, and the difference in the groove surface area ratio, calculated as a percentage, is not less than 7 and not more than 15. Also, the pneumatic tires arranged on the front wheel side and on the rear wheel side have a total groove surface area ratio that is greater on the front wheel side than on the rear wheel side in the ground contact width, and the difference in the total groove surface area ratio, calculated as a percentage, is not less than 3 and not more than 10. Also, the pneumatic tires arranged on the front wheel side and on the rear wheel side have a ratio of the average value of the groove width of all of the circumferential direction grooves on the vehicle inner side to the groove width of the circumferential direction groove having the greatest width on the vehicle inner side, in the ground contact width, that is greater on the rear wheel side than on the front wheel side, and the difference in the ratio of the circumferential direction grooves, calculated as a percentage, is not less than 1 and not more than 10. Also, the pneumatic tires arranged on the front wheel side and on the rear wheel side have a ratio of the total groove surface area of the lug grooves on the vehicle outer side to the total groove surface area of the lug grooves on the vehicle inner side, in the ground contact width, that is greater on the front wheel side than on the rear wheel side, and the difference in the total groove surface area ratio of the lug grooves, calculated as a percentage, is not less than 6 and not more than 20.

In addition, as shown in FIGS. 3A-3B, in addition to Working Example 1 to Working Example 8, the following applies to the combination pneumatic tires of Working Example 9 to Working Example 11 and Working Example 13. The pneumatic tires arranged on the front wheel side and on the rear wheel side have a ratio of the groove width of the circumferential direction groove having the greatest width on the vehicle outer side of the front wheel side to the ground contact width, calculated as a percentage, that is not less than 7% and not more than 9%, and have a ratio of the groove width of the circumferential direction groove having the greatest width on the vehicle outer side of the rear wheel side to the ground contact width, calculated as a percentage, that is not less than 6% and not more than 8%. Also, the difference in the ratio of the circumferential direction groove having the greatest width on the vehicle outer side to the ground contact width, calculated as a percentage, between the front wheel side and the rear wheel side is within 1. In addition, the ratio of the average value of the groove width of all of the circumferential direction grooves on the vehicle inner side to the groove width of the circumferential direction groove having the greatest width on the vehicle inner side, with respect to the ground contact width, is greater on the rear wheel side than the front wheel side, and the difference in the ratio of the circumferential direction grooves, calculated as a percentage, is not less than 4 and not more than 10.

In addition, the following applies to the combination pneumatic tires of Working Example 12 and Working Example 13, in addition to Working Example 1 to Working Example 11, as shown in FIGS. 3A-3B. That is, the pneumatic tires arranged on the front wheel side and the rear wheel side have a the total groove surface area of the lug grooves on the front wheel side be greater on the vehicle outer side than on the vehicle inner side, and have the total groove surface area of the lug grooves on the rear wheel side be greater on the vehicle inner side than on the vehicle outer side.

In contrast, the combination pneumatic tire of the Conventional Example and of each of Comparative Example 1 to Comparative Example 3, as illustrated in FIGS. 3A-3B, do not satisfy at least one of the conditions defined for Working Example 1 to Working Example 13.

As shown by the test results of FIGS. 3A-3B, the combination pneumatic tire of each of Working Example 1 to Working Example 13 clearly achieves steering stability performance on both the dry road surface and the wet road surface to a high degree.

What is claimed is:

1. A pneumatic tire mount method used with a plurality of pneumatic tires mounted on a vehicle, comprising: determining an orientation of an inner side and an outer side with respect to left and right sides of the vehicle, and determining a position on a front wheel side and a rear wheel side of the vehicle, for each of the pneumatic tires; wherein each of the pneumatic tires are provided with at least one circumferential direction groove formed in a tread surface on a vehicle inner side and vehicle outer side of a tire equatorial plane, and extending in a tire circumferential direction, and provided with a plurality of lug grooves formed in the tire circumferential direction, extending in a direction orthogonal to the circumferential direction groove, at least on the tread surface of a land portion on an outermost side in a tire width direction, among a plurality of land portions partitioned by the circumferential direction groove and extending in the tire circumferential direction;

each of the pneumatic tires arranged on the rear wheel side have a total groove surface area ratio with respect to a ground contact width of not less than 20% and not more than 27%;

each of the pneumatic tires arranged on the front wheel side and on the rear wheel side also have a groove surface area ratio that is smaller on the vehicle outer side than on the vehicle inner side, with respect to the ground contact width, a difference in the groove surface area ratio, calculated as a percentage, being not less than 7 and not more than 15;

each of the pneumatic tires arranged on the front wheel side and on the rear wheel side also have the total groove surface area ratio with respect to the ground contact width that is greater on the front wheel side than on the rear wheel side, a difference in the total groove surface area ratio, calculated as a percentage, being not less than 3 and not more than 10;

each of the pneumatic tires arranged on the front wheel side and on the rear wheel side also have a ratio of an average value of a groove width of all of the circumferential direction grooves on the vehicle inner side to a groove width of one of the circumferential direction grooves having a greatest width on the vehicle inner side, with respect to the ground contact width, that is greater on the rear wheel side than on the front wheel side, a difference in the ratio of the circumferential direction grooves, calculated as a percentage, being not less than 1 and not more than 10; and each of the pneumatic tires arranged on the front wheel side and on the rear wheel side also have a ratio of a total groove surface area of the lug grooves on the vehicle outer side to a total groove surface area of the lug grooves on the vehicle inner side, with respect to the ground contact width, that is greater on the front wheel side than on the rear wheel side, a difference in the total groove surface area ratio of the lug grooves, calculated as a percentage, being not less than 6 and not more than 20.

2. The pneumatic tire mount method according to claim 1, wherein each of the pneumatic tires arranged on the front wheel side and on the rear wheel side has a ratio of the groove width of one of the circumferential direction grooves having the greatest width on the vehicle outer side of the front wheel side to the ground contact width, calculated as a percentage, that is not less than 7% and not more than 9%, and has a ratio of the groove width of the one of the circumferential direction grooves having the greatest width on the vehicle outer side of the rear wheel side to the ground contact width, calculated as a percentage, that is not less than 6% and not more than 8%, a difference in the ratio of the one of the circumferential direction grooves having the greatest width on the vehicle outer side to the ground contact width, calculated as a percentage, between the front wheel side and the rear wheel side being within 1, and the ratio of the average value of the groove width of all of the circumferential direction grooves on the vehicle inner side to the groove width of the one of the circumferential direction grooves having the greatest width on the vehicle inner side, with respect to the ground contact width, is greater on the rear wheel side than on the front wheel side, the difference in the ratio of the circumferential direction grooves, calculated as a percentage, being not less than 4 and not more than 10.

3. The pneumatic tire mount method according to claim 1, wherein each of the pneumatic tires arranged on the front wheel side and on the rear wheel side has a total groove surface area of the lug grooves on the front wheel side be greater on the vehicle outer side than on the vehicle inner side, and has a total groove surface area of the lug grooves on the rear wheel side be greater on the vehicle inner side than on the vehicle outer side.

4. The pneumatic tire mount method according to claim 2, wherein each of the pneumatic tires arranged on the front wheel side and on the rear wheel side has a total groove surface area of the lug grooves on the front wheel side be greater on the vehicle outer side than on the vehicle inner side, and has a total groove surface area of the lug grooves on the rear wheel side be greater on the vehicle inner side than on the vehicle outer side.

* * * * *